United States Patent
Tsurutani et al.

[19]

[11] Patent Number: 6,090,322

[45] Date of Patent: Jul. 18, 2000

[54] METHOD FOR PRODUCING SEALING MEMBER FOR BATTERY

[75] Inventors: Shinji Tsurutani, Hirakata; Syunichi Tanoue, Yasu-gun; Fumio Daio, Kitakatsuragi-gun, all of Japan

[73] Assignees: Matsushita Electric Industrial Co., Ltd., Osaka-fu; Shinsei Kagaku Kogyo Co., Ltd., Shiga-ken, both of Japan

[21] Appl. No.: 09/092,219

[22] Filed: Jun. 5, 1998

[30] Foreign Application Priority Data

Jun. 9, 1997 [JP] Japan ................................... 9-151219

[51] Int. Cl.[7] ...................................................... B29B 15/10
[52] U.S. Cl. ........................ 264/135; 264/275; 264/276; 264/279; 264/511; 425/3; 425/129.1
[58] Field of Search ..................... 425/3, DIG. 33, 425/129.1; 264/511, 328.7, 275, 279, 135, 276

[56] References Cited

U.S. PATENT DOCUMENTS

| | | | |
|---|---|---|---|
| 2,304,984 | 12/1942 | Wood | .................... 264/275 |
| 3,069,489 | 12/1962 | Carmichael et al. | . |
| 3,096,217 | 7/1963 | Clune | . |
| 3,759,644 | 9/1973 | Ladney, Jr. | ............... 425/129 |
| 5,571,637 | 11/1996 | Idota | ....................... 429/218 |
| 5,612,062 | 3/1997 | Takahashi | .................... 425/3 |
| 5,705,294 | 1/1998 | Lake | ........................ 429/163 |
| 5,882,568 | 3/1999 | Kashiwagi | ............... 264/275 |

*Primary Examiner*—Jan H. Silbaugh
*Assistant Examiner*—Dae Young Lee
*Attorney, Agent, or Firm*—Akin, Gump, Strauss, Hauer & Feld, L.L.P.

[57] ABSTRACT

A method for producing a sealing member for a battery includes integrally insert-molding a gasket on a peripheral edge of a metal sealing plate. The gasket is molded on the peripheral edge of the metal sealing plate by inserting the metal sealing plate between the female and male molds, the female mold having a concave surface conforming to the upper surface of the metal sealing plate and provided with a magnet or vacuum suction mouth to attract the metal sealing plate in its center, and the male mold having a surface conforming to the lower surface of the metal sealing plate, then injecting a molten resin into a cavity formed between the female mold and the male mold while pressing the female and male molds against each other by an elastic member.

2 Claims, 3 Drawing Sheets ized mounting of a gasket on the peripheral edge of a metal sealing plate.

METHOD FOR PRODUCING SEALING MEMBER FOR BATTERY

TITLE OF THE INVENTION

Method for producing sealing member for battery

BACKGROUND OF THE INVENTION

The present invention relates to an improved method for producing a sealing member for a battery by integrally molding a gasket on the peripheral edge of a metal sealing plate.

There have been known batteries each having a metal container which accommodates a power generating element therein and a sealing member which seals the open end of the metal container. The sealing member has a metal sealing plate and a resin gasket. Those batteries use various electrolytes such as nonaqueous electrolytes, alkaline electrolytes and acid electrolytes. The sealing members had been produced by mounting a previously formed gasket on the sealing plate. To secure the adhesion between the sealing plate and the gasket thereby to achieve high electrolyte leakage resistance, an electrolyte-resistant sealing agent is interposed between them as necessary. Such process is indispensable especially in battery systems using alkaline electrolytes sinse the alkaline electrolyte itself exhibits a noticeable tendency to creep or a property of rising up along the metal surface.

As set forth, producing of sealing member required a step of molding a gasket and another step of integrally combining the gasket obtained and the sealing plate.

In order to simplify the process of producing such sealing members, there are proposed attempts of insert-molding a gasket on the peripheral edge of a sealing plate, for example, in Japanese Laid-Open Patent Publication No. Sho 50-91720.

The usual method for producing a sealing member by insert-molding the gasket onto a sealing plate is as follows. First, a sealing plate is provided between a female or concave mold of a molding apparatus having a concave face conforming to the upper surface of the sealing member to be obtained and a male or convex mold with a convex face conforming to the lower surface of the sealing member. The two molds are then clamped, followed by injecting a resin gasket material into a cavity formed on the peripheral edge of the sealing plate.

Usage of such ordinary molding apparatus for the above-mentioned insert-molding, however, inevitably brings about faulty moldings such as flowing out of resin onto unwanted areas of the sealing plate, detachment or dislocation of the sealing plate from the mold. These faults are caused by delicate differences or ununiformity in molding conditions including configuration of the sealing plate, molding temperature, molding pressure, mold clamping pressure, temperature of cooling water and molding cycle. Such faults also appears even when a lot of the resin gasket material is changed. The other problems encountered include sticking to the mold of the sealing agent applied to the sealing plate. Especially fatal is the resin flowing over to the inner surface of the sealing plate. Since the inner surface is in contact with the power generating element, the resin flowing over spoils conductivity of the battery.

BRIEF SUMMARY OF THE INVENTION

It is an object of the present invention to provide a method for molding a gasket on a metal sealing plate which is free from the foregoing problems such as detachment of the sealing plate from the mold, dislocation of the sealing plate or adhesion of the resin gasket material to unwanted areas of the metal sealing plate.

The present invention provides a method for producing a sealing member for a battery, which has a metal sealing plate and a synthetic resin gasket integrally mounted on the peripheral edge of the metal sealing plate comprising the steps of:

inserting a metal sealing plate between a female mold and a male mold, the female mold having a concave surface conforming to the upper surface of the metal sealing plate and provided with a magnet to attract or vacuum suction mouth to suck up the metal sealing plate in its center, and the male mold having a surface conforming to the lower surface of the metal sealing plate;

pressing the female and male molds against each other by an elastic member; and injecting a molten resin into a cavity formed between the female and male molds to integrally mold a gasket on the peripheral edge of the metal sealing plate.

According to the present invention, the sealing plate is attracted by the magnet or vacuum suction. Therefore, the sealing plate can be prevented from the detachment and dislocation.

In addition, if the magnet is movable up and down, and if the female mold is further provided with an elastic member to thrust the magnet on the sealing plate, the hold of the sealing plate by the mold will be further strengthened. Thus, according to the present invention, it is possible to make a sealing plate free from the resin sticking to unwanted areas without using a high precision mold.

Various kinds of resin can be employed as the gasket material. For example, polyethylene, polypropylene and polyphenylene sulfide can be used for lithium batteries, and polyamide can be used for alkaline batteries.

The adhesion between the sealing plate and the gasket can be increased by interposing a sealing agent therebetween. The sealing agent is provided on the peripheral edge of the sealing plate or where a gasket is to be molded, prior to molding the gasket. Effective sealing agents are epoxy resin and heat-resistant organic silicon compounds such as a silane coupling agent.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
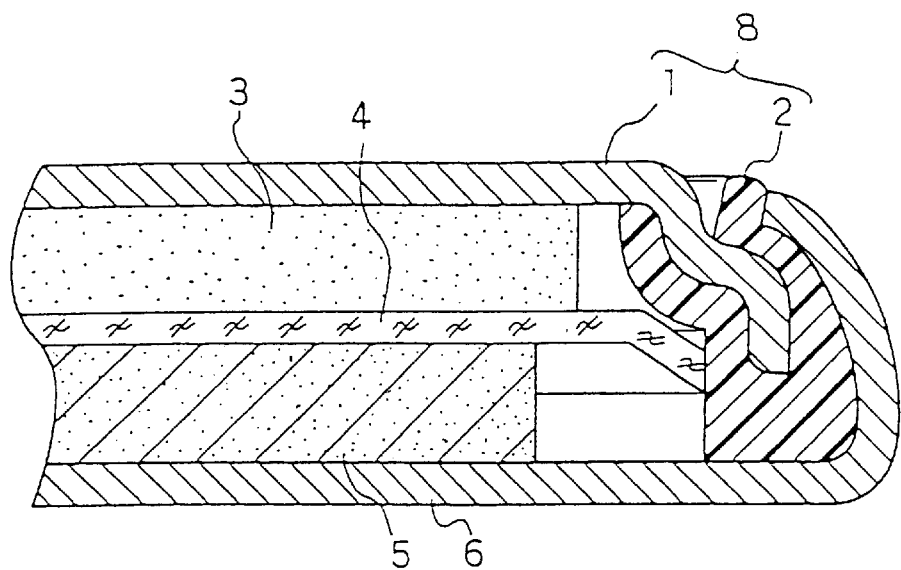
FIG. 1 is a longitudinal fragmentary sectional view showing the main part of a coin-type manganese dioxide lithium primary battery used in the first embodiment of the present invention.

Now, as the preferred embodiments of the present invention, methods for producing the sealing member used for a coin-type battery will be described in detail with reference to the attached drawings.

EXAMPLE 1

In the present example, there will be explained the method for producing a sealing member used in a coin-type manganese dioxide lithium primary battery shown in FIG. 1.

A sealing member 8 has a metal sealing plate 1 which is concurrently a negative electrode terminal and a gasket 2 integrated on a bent peripheral edge of the sealing plate 1. The gasket 2 is made of polypropylene, for example. The sealing member 8 seals the open end of a container 6 which accommodates a power generating element including a positive electrode 5, a separator 4 and a negative electrode active material 3. The container 6 also serves as the positive electrode terminal.

Figure 2:
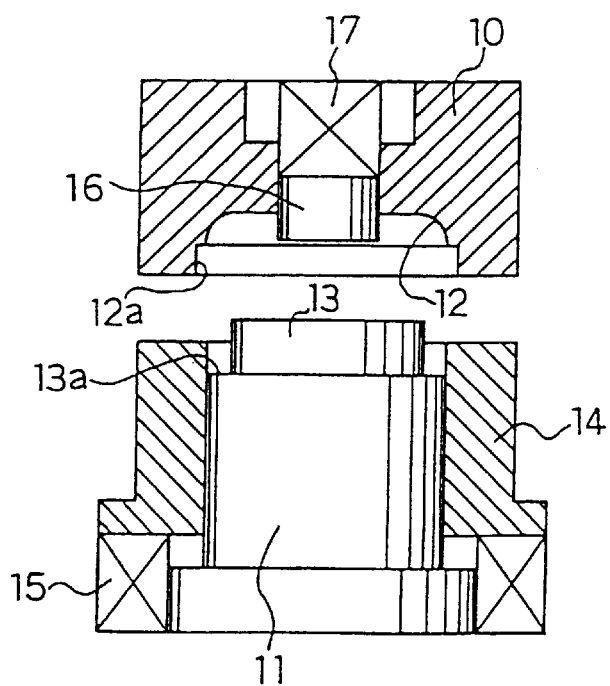
FIG. 2 is a longitudinal sectional view showing the main part of a molding apparatus used in the same embodiment.
Figure 3:
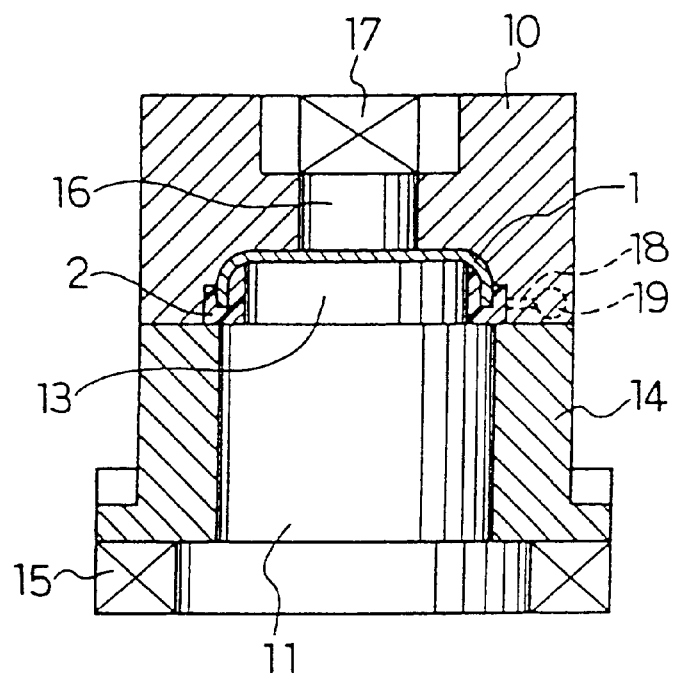
FIG. 3 is a longitudinal sectional view showing the main part of the same molding apparatus at modling.

The main part of a molding apparatus used in the present example is shown in FIG. 2 and FIG. 3. A female mold 10 has a concave portion 12 conforming to the shape of the upper surface of the sealing plate 1 on its bottom surface. A magnet 16 and spring 17 movable up and down for thrusting the magnet 16 downward are provided in the center of the concave portion 12. A male mold 11 has a convex portion 13 conforming to the shape of the lower surface of the sealing plate 1. The male mold 11 is provided with a fitted-in movable core 14 which cooperates with the male mold 11 and a spring 15 for thrusting the movable core 14 upward. The female mold 10 is provided with a gate 18 and a runner 19 which lead a resin material for the gasket 2. The runner 19 is connected to the sprue of a sprue bush (not shown).

In molding the sealing member 8 using this molding apparatus, the sealing plate 1 is first put on the convex portion 13 of the male mold 11, and the female mold 10 is moved down. Then, the sealing plate 1 is clamped by the magnet 16, and the female mold 10 is further moved downward, thereby pressing down the movable core 14 outdoing the elastic force of the springs 15. With the sealing plate 1 clamped between the female mold 10 and the male mold 11 in this way, the molds 10 and 11 are pressed against each other by the elastic force of the springs 15, and the sealing plate 1 is compressed by the spring 17. Then, there is formed a cavity surrounded by a step portion 12a of the female mold 10, a side of the convex portion 13 of the male mold 11, a shoulder portion 13a connected to the convex portion 13 and the top end face of the movable core 14. In this state, a molten resin is fed in that cavity through the runner 19 and the gate 18 to integrally mold a gasket 2 on the peripheral edge of the sealing plate 1.

In molding the gasket 2 using the female mold 10 and the male mold 11 mentioned above, the sealing plate 1 is clamped by a magnet 16 and will not detach or dislocate. Even if there is an uniformity in thickness of the metal sealing plate 1, the resin material will not flow out to other than the specific area, because the spring 15 presses the molds 10 and 11 against each other and the spring 17 forces the magnet 16 to press the sealing plate 1, thereby bringing the molds 10 and 11 in close contact with the sealing plate 1. In this way, a specific gasket can be formed on a metal sealing plate.

Actually, 5 lots, one lot made up of 5,000 pieces, of sealing members 8 were produced using this molding apparatus.

COMPARATIVE EXAMPLE 1

As a comparative example, 5 lots, one lot made up of 5,000 pieces, of sealing members 8 were produced in the same way but using male and female molds with no magnet and spring.

Table 1 shows the yields (percentage nondefective) in comparison.

TABLE 1

| | Yield (percent nondefective) | |
|---|---|---|
| Lot No. | Example 1 | Comparative Example 1 |
| 1 | 100 | 85 |
| 2 | 100 | 96 |
| 3 | 99 | 92 |
| 4 | 100 | 82 |
| 5 | 100 | 83 |

Next, coin-type manganese dioxide lithium primary batteries as shown in FIG. 1 were assembled using those sealing members 8 obtained.

A pellet-shaped positive electrode 5 contains manganese dioxide as an active material. The positive electrode 5 was prepared as follows. At first, 100 parts by weight of manganese dioxide heat-treated at 400° C. and 7 parts by weight of graphite as a conductive material were mixed. Then, 430 mg of thus obtained mixture was press-molded using a mold 15.7 mm in diameter under a pressure of 4 t/cm$^2$, followed by drying at 250° C.

A polypropylene unwoven fabric was used as a separator 4. An active material 3 of the negative electrode was a disk of lithium 0.25 mm in thickness and 20 mm in diameter. An electrolyte was prepared by dissolving lithium perchlorate as a solute in 0.5 mol/liter in a mixed solvent of propylene carbonate and dimethoxyethane.

Five lots, one lot made up of 1,000 pieces, of batteries were assembled using the sealing members obtained in the example and the comparative example, respectively. Thus obtained batteries were put to an electrolyte leakage resistance test. In the test, a cycle of storing the battery in a thermostat maintained at 70° C. for one hour then storing the battery in a thermostat maintained at 15° C. for one hour was repeated 100 times. The results are shown in Table 2.

TABLE 2

| | Percent leakage | |
|---|---|---|
| Lot No. | Example 1 | Comparative Example 1 |
| 1 | 0 | 13 |
| 2 | 0 | 10 |
| 3 | 0 | 5 |
| 4 | 0 | 16 |
| 5 | 0.1 | 4 |

EXAMPLE 2

Figure 4:
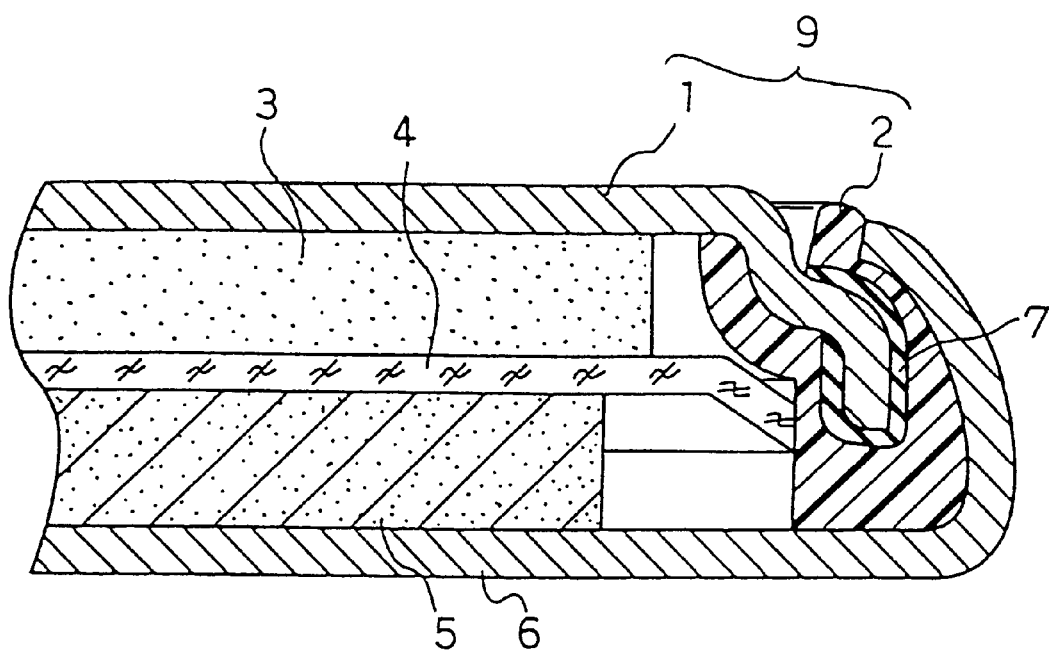
FIG. 4 is a longitudinal fragmentary sectional view showing the main part of a coin-type manganese dioxide lithium primary battery used in another embodiment of the present invention.

A sealing member 9 shown in FIG. 4 which is identical with the one in Example 1 but provided with a sealing agent layer 7 on the peripheral edge of the sealing plate 1 was produced using the same molding apparatus as in Example 1.

COMPARATIVE EXAMPLE 2

As a comparative example, a sealing member also having the sealing agent layer 7 was produced using male and female molds with no magnet and spring.

In these examples, prior to the molding, the sealing agent layer 7 was formed by applying a toluene solution of a polypropylene modified with maleic acid (trade name "HARDLEN" by Toyo Kasei Kogyo Co., Ltd.) on the peripheral edge of the sealing plate 1, followed by baking for 30 seconds at 130° C.

The yield (percent nondefective) of sealing members per 5,000-piece lot (5 lots) is shown in Table 3.

TABLE 3

| | Yield (percent nondefective) | |
|---|---|---|
| Lot No. | Example 2 | Comparative Example 2 |
| 1 | 100 | 75 |
| 2 | 100 | 60 |
| 3 | 100 | 67 |
| 4 | 100 | 80 |
| 5 | 99 | 66 |

Next, five lots, one lot made up of 1,000 pieces, of coin-type manganese dioxide lithium primary batteries as shown in FIG. 4, were assembled with the sealing members thus obtained.

COMPARATIVE EXAMPLE 3

Figure 5:
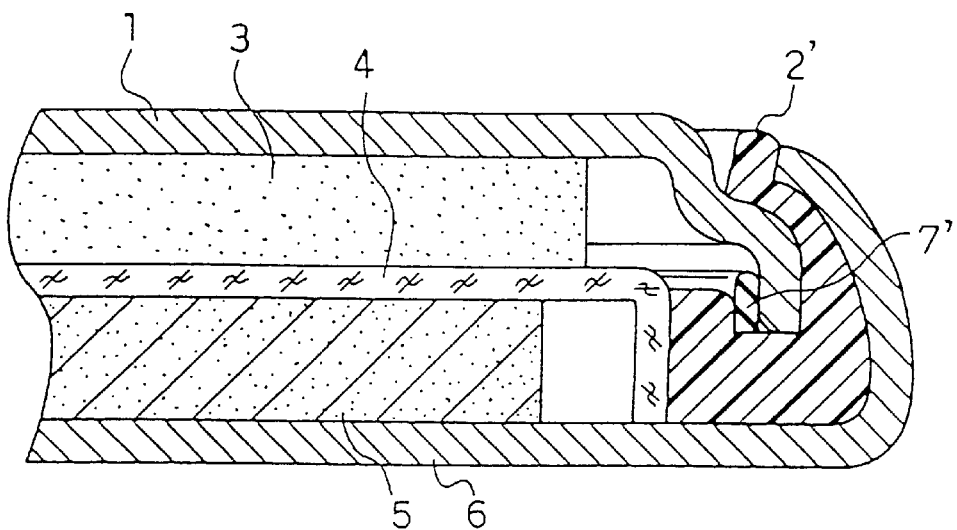
FIG. 5 is a longitudinal fragmentary sectional view showing the main part of a conventional coin-type manganese dioxide lithium primary battery.

In a comparative example, five 1,000-piece lots of coin-type manganese dioxide lithium primary batteries shown in FIG. 5 were assembled using a sealing member by mounting a gasket 2' previously formed onto the sealing plate 1. Sealing agent layer 7' is positioned between the inner surface of the sealing plate 1 and the gasket 2'.

The batteries thus obtained were subjected to the electrolyte leakage test in the same manner as in Example 1. The results are shown in Table 4.

TABLE 4

| | Percent leakage | |
|---|---|---|
| Lot No. | Example 2 | Comparative Example 3 |
| 1 | 0 | 14 |
| 2 | 0 | 18 |
| 3 | 0 | 7 |
| 4 | 0 | 21 |
| 5 | 0 | 12 |

EXAMPLE 3

Figure 6:
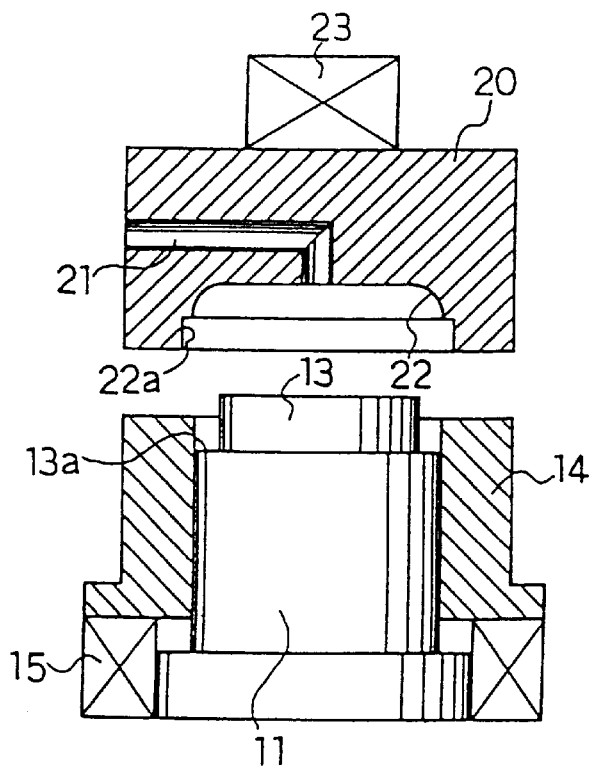
FIG. 6 is a longitudinal sectional view showing the main part of a molding apparatus used in still another embodiment.

The molding apparatus of the present example is shown in FIG. 6. In this apparatus, a female mold 20 has a concave portion 22 and a step portion 22a conforming to a shape of a sealing member. The female mold 20 used in the present example has a suction mouth 21 in the center of the concave portion 22. Further, a spring 23 to thrust the female mold 20 downward is provided above the female mold 20.

In this example, the male mold 11 is provided with a movable core 14 which cooperates with the male mold 11. It is also possible for the shoulder portion 13a of the male mold 11 to take place of the movable core 14. The springs 15 and 23 are a coil spring, for example. The spring 23 can be a belleville spring.

As set forth above, the present invention can keep down the percent operation defectives resulted from detachment of the sealing plate from the mold or dislocation in production by the insert-molding of the sealing member for batteries. It is also possible to obtain sealing members of uniform quality without the resin sticking to other than the specific area. Thus, the invention can reduce the costs of producing sealing members and ensure a high quality stably, and can also provide batteries with an improved electrolyte leakage resistance and a high reliability.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A method for producing a sealing member for a battery which has a metal sealing plate and a synthetic resin gasket integrally mounted on a peripheral edge of the metal sealing plate, said method comprising the steps of:

inserting a metal sealing plate having an upper surface, a lower surface and a peripheral edge, between a female mold and a male mold, said female mold having a concave surface conforming to the upper surface of said metal sealing plate and provided with a magnet and a first elastic member in a center area of said female mold, said elastic member positioned for thrusting said magnet toward said upper surface of said metal sealing plate to add a compressing force to said metal sealing plate, and said male mold having a surface conforming to the lower surface of said metal sealing plate;

pressing said female mold and said male mold against each other by a second elastic member to clamp the metal sealing plate between said female mold and said male mold, the metal sealing plate being clamped by said magnet thrust toward said metal sealing plate by said first elastic member; and injecting a molten resin into a cavity formed between said female mold and said male mold to form a gasket on the peripheral edge of said metal sealing plate.

2. The method for producing a sealing member for a battery in accordance with claim 1, further comprising the step of applying a sealing agent on the peripheral edge of said metal sealing plate prior to formation of the gasket.

* * * * *